(12) United States Patent
Handforth et al.

(10) Patent No.: US 6,769,812 B1
(45) Date of Patent: Aug. 3, 2004

(54) METHOD AND APPARATUS FOR FORMING AN OPTICAL MODULE WITH OPTICAL AND ELECTRICAL CONNECTIONS FACING ONE DIRECTION

(75) Inventors: Martin R. Handforth, Kanata (CA); John Joseph Stankus, Plano, TX (US); Dominic John Goodwill, Kanata (CA)

(73) Assignee: Nortel Networks, Ltd, St. Laurent (CA)

( * ) Notice: Subject to any disclaimer, the term of this patent is extended or adjusted under 35 U.S.C. 154(b) by 9 days.

(21) Appl. No.: 10/238,655

(22) Filed: Sep. 10, 2002

Related U.S. Application Data

(60) Provisional application No. 60/392,920, filed on Jul. 1, 2002.

(51) Int. Cl.[7] ................................................ G02B 6/38
(52) U.S. Cl. ........................................ 385/75; 439/930
(58) Field of Search ................................ 439/630, 930; 385/53, 56, 58, 59, 75, 134, 135

(56) References Cited

U.S. PATENT DOCUMENTS

| | | | |
|---|---|---|---|
| 4,597,631 A | * | 7/1986 | Flores ........................ 385/53 |
| 4,895,425 A | | 1/1990 | Iwano et al. |
| 4,906,197 A | | 3/1990 | Noll |
| 5,013,247 A | | 5/1991 | Watson |
| 5,412,497 A | | 5/1995 | Kaetsu et al. |
| 5,943,456 A | | 8/1999 | Buchholz et al. |
| 6,247,944 B1 | | 6/2001 | Bolognia et al. |
| 6,263,136 B1 | | 7/2001 | Jennings et al. |
| 6,457,872 B1 | * | 10/2002 | Besler ........................ 385/56 |
| 6,485,192 B1 | | 11/2002 | Plotts et al. |
| 6,568,961 B1 | * | 5/2003 | Liburdi ........................ 439/630 |

* cited by examiner

Primary Examiner—Khiem Nguyen
(74) Attorney, Agent, or Firm—John C. Gorecki

(57) ABSTRACT

An optical module includes a body having a proximal end and a distal end, a first optical connector disposed on the body to face the proximal end of the body, a first shelf extending from the body, and a first electrical connector disposed on the first shelf to face the proximal end of the body. Additional optical and electrical connectors and shelves may be included. The optical and electrical connectors may be disposed on the body of the optical connector at different distances from the proximal end of the body to enable electrical signals and optical signals to be transferred from/to the optical module in different physical regions. The optical connector(s) may mate with a receptor in a connector plane, may be positioned adjacent an aperture in a connector plane to receive a mating connector through the aperture, or may extend through the aperture to receive a mating connector.

20 Claims, 10 Drawing Sheets

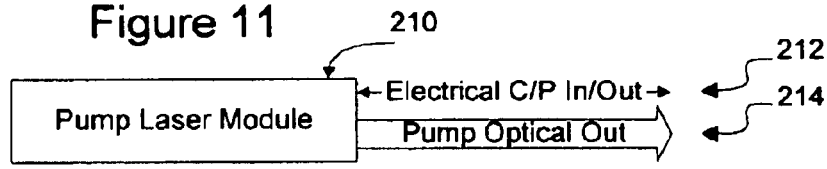
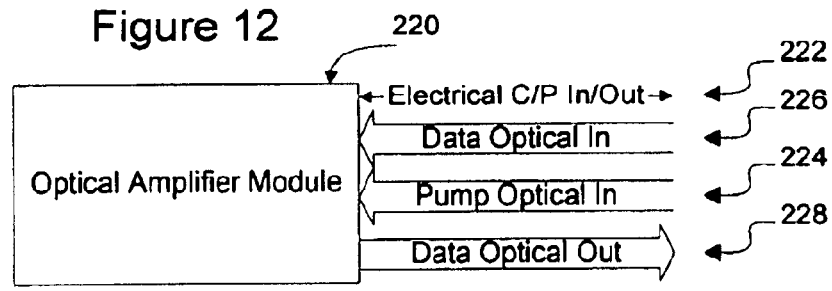
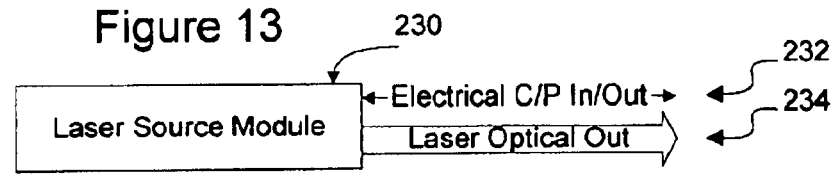
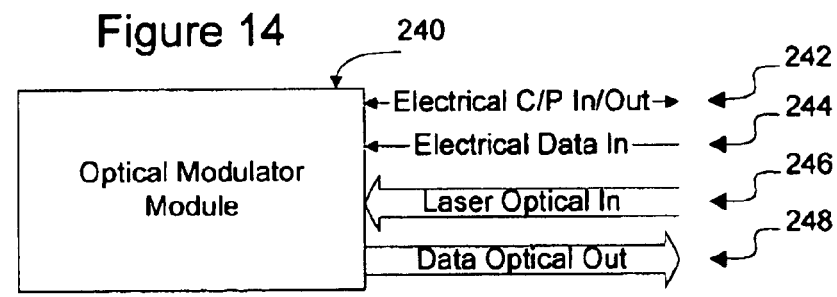

METHOD AND APPARATUS FOR FORMING AN OPTICAL MODULE WITH OPTICAL AND ELECTRICAL CONNECTIONS FACING ONE DIRECTION

CROSS REFERENCE TO RELATED APPLICATIONS

This application is a continuation in part of provisional U.S. patent application Ser. No. 60/392,920, the content of which is hereby incorporated herein by reference.

BACKGROUND OF THE INVENTION

1. Field of the Invention

The present invention relates to optical components and, more particularly, to a method and apparatus for forming an optical module with optical and electrical connections facing one direction.

2. Description of the Related Art

Data communication networks may include various computers, servers, nodes, routers, switches, hubs, proxies, and other devices coupled to and configured to pass data to one another. These various network elements will be referred to herein as "network devices". Data is communicated through the data communication network by passing data packets (or data cells or segments) between the network devices by utilizing one or more communication links between the devices. A particular packet may be handled by multiple network devices and cross multiple communication links as it travels between its source and its destination over the network. Network devices are typically configured to transport data packets from one interface to another to facilitate delivery of packets or streams of data over a network. Network devices are not configured to process the data and/or alter the data within the packet or stream of data, except as necessary to make any required transportation decisions or perform functions related to packet transportation.

Conventional network devices include a plurality of optical modules configured to perform discrete optical functions, such as to convert electrical signals to optical signals or to convert optical signals to electrical signals. Utilizing optical modules enables faulty optical components to be replaced quickly and inexpensively.

As data networks have grown in complexity and speed, the network devices used in those networks have likewise increased in complexity and speed. These advancements make it desirable to utilize larger numbers of optical modules to facilitate higher data throughput and increased functionality. Unfortunately, the physical size of the network device may not be increased dramatically to accommodate the larger numbers of optical modules, since consumers typically will not purchase a network device with an overly large footprint.

SUMMARY OF THE INVENTION

The present invention overcomes these and other drawbacks by providing an optical module having electrical and optical connectors disposed on, adjacent, or facing one end of the optical module, so that the electrical and optical connections may all be terminated at, in, or through a connector plane. This enables fiber management to take place independent of the electrical and optical connections to the module, which simplifies replacement of faulty or obsolete optical modules. Additionally, the compact design enables a greater number of optical modules to be used on a given connector plane, thus increasing the density of optical modules within a given network device.

According to one embodiment of the invention, an optical module includes a body having a proximal end and a distal end, a first optical connector disposed on the body to face the proximal end of the body, a first shelf extending from the body, and a first electrical connector disposed on the first shelf to face the proximal end of the body. Additional optical and electrical connectors and shelves may be included. The optical and electrical connectors may be disposed on the body of the optical connector at different distances from the proximal end of the body to enable electrical signals and optical signals to be transferred from/to the optical module in different physical regions. This may facilitate differential electrical and fiber management schemes. The optical connector(s) may be configured to mate with a receptor in a connector plane, may be positioned adjacent an aperture in a connector plane to receive a mating connector on an optical cable disposed through the aperture, or may be configured to extend through the aperture in the connector plane to receive a mating connector on an optical cable.

BRIEF DESCRIPTION OF THE INVENTIONS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 11–19 are functional block diagrams of optical modules according to embodiments of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention. As described in greater detail below, the optical module of the present invention has both electrical and optical connectors disposed on the same end of the optical module. This configuration enables the network device to utilize enhanced fiber management techniques, realize increased module density, and facilitates replacement of aging or damaged optical modules.

Figure 1:
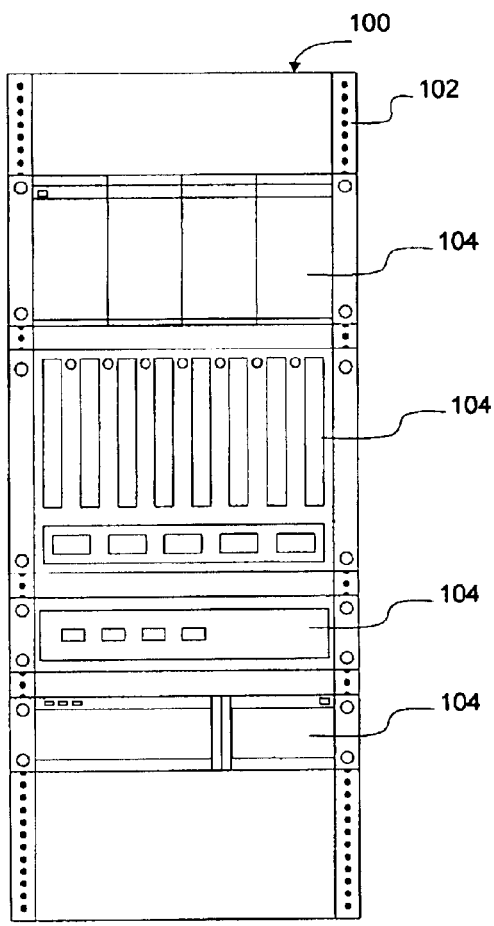
FIG. 1 is a block diagram of a rack containing network devices according to one aspect of the invention.

Network devices are conventionally configured for operation as either stand-alone devices or rack mounted devices. One example of a rack-mounted system is illustrated in FIG. 1. As shown in FIG. 1, a rack 100 is typically configured with mounting strips 102 on either side such that multiple network devices 104 may be housed in the rack 100. By vertically stacking network devices 104 in this manner, it is possible to increase the number of network devices 104 that may be housed in a given room while optionally enabling shared power distribution, thermodynamic regulation, and other sundry benefits. A stand-alone unit, by contrast, is not housed with other units on a rack but rather is placed by itself on the floor or on top of other network devices. Network devices may also be configured as stand-alone boxes with self-contained or shared power distribution and thermodynamic regulation. These stand-alone network devices may be relatively large network devices or, for smaller nodes, may be relatively small (e.g. roughly the size of a desk-top computer).

Figure 2:
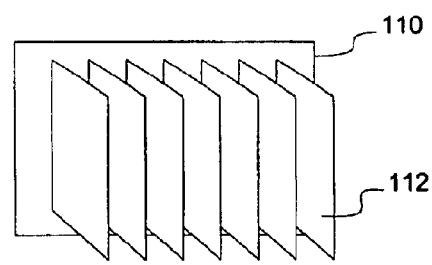
FIG. 2 is a perspective view of a back-plane with attached functional cards.
Figure 3:
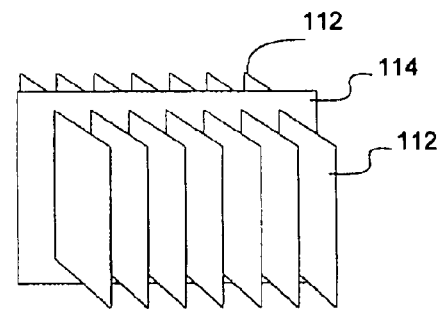
FIG. 3 is a perspective view of a mid-plane with attached functional cards.

Network devices may be configured, as shown in FIG. 2, with a back-plane 10 and functional cards 112, or, as shown in FIG. 3, with a mid-plane 114 and functional cards 112. One difference between a back-plane 110 and a mid-plane 114, is that a mid-plane 114 is configured to receive functional cards 112 on two surfaces, whereas a back-plane 110 is configured to receive functional cards 112 on only one surface. For example, in the embodiments illustrated in FIGS. 2 and 3, the back-plane 110 of FIG. 2 is configured to receive functional cards 112 on its front surface whereas the mid-plane 114 of FIG. 3 is configured to receive functional cards 112 on both its front and rear surfaces. The functional cards may all be oriented in the same direction, for example vertical as illustrated, or may be oriented in different directions relative to each other, for example both vertical and horizontal (not illustrated). As used herein, the term "connector plane" will be used to refer generically to a back plane, a mid-plane, a functional card, or any other type of device configured to interconnect functional cards or optical modules.

Optical Modules

Optical components are often modularized to enable individual components to be replaced upon failure. These optical modules may perform many functions, such as optical signal amplification, electrical to optical signal conversion, or optical to electrical signal conversion. Such optical modules are commonly used at the interface between an electrical based network switching device and a fiber-optic network link, or at a signal regeneration point in the optical link.

Optical modules conventionally have been configured with optical connections on one end and electrical connections on the other, so that an optical cable can be attached to one end of the module and the other end, containing electrical connectors, can be plugged into a connector plane. To facilitate replacement, the optical modules are commonly placed along an edge of the connector plane adjacent to the front of the network device to provide easy access to the optical module. While the optical modules are readily accessible, there is only a limited amount of space along the outside edge of the connector plane. Additionally, the orientation of the optical modules requires that the fibers entering the optical modules be exposed on the front of the network device. This "fiber spaghetti" is unsightly and difficult to work with, as it may prove to be difficult to find the correct optical fiber from the myriad of optical fiber choices presented.

Figure 4:
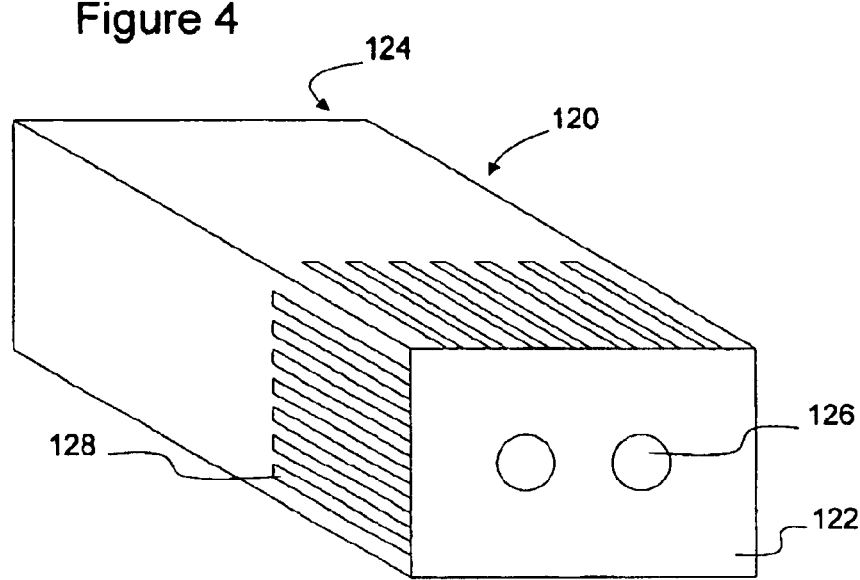
FIGS. 4 and 5 are perspective views of optical modules according to embodiments of the invention.
Figure 5:
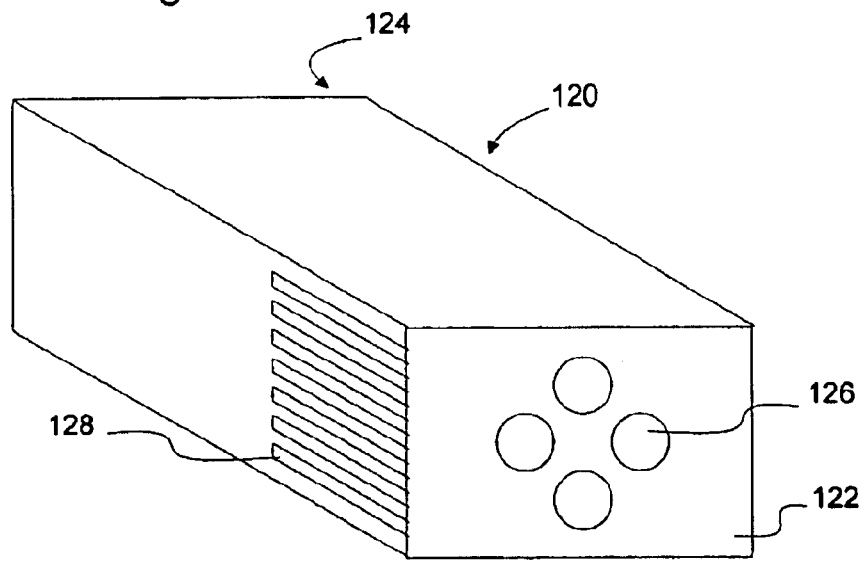

FIGS. 4 and 5 illustrate two embodiments of optical modules according to the invention that enable both electrical and optical connectors to be connected to or through a connector plane. As shown in FIGS. 4 and 5, the optical module according to this embodiment of the invention has both electrical and optical connectors disposed on or adjacent a single end of the optical module. Placing the optical and electrical connectors on the same end of the optical module enables both optical and electrical connections to be made with or through a connector plane. This enables fiber management to be established independently of the placement of the module, which simplifies replacement of faulty or obsolete optical modules. Additionally, the compact design enables a greater number of optical modules to be used on a given connector plane, thus increasing the density of optical modules within a given network device.

As shown in FIG. 4, the optical module 120 has a proximal end 122 and a distal end 124. At least a first optical connector 126 and a first electrical connector 128 are disposed on the optical module proximate the proximal end 122. Optionally, as shown in the embodiment illustrated in FIGS. 4 and 5, additional optical connectors 126 and/or additional electrical connectors 128 may be disposed on or adjacent the proximal end 122 to enable greater numbers of optical and/or electrical signals to be passed from and to the optical module 120. The optical module may be square, as illustrated in FIGS. 4 and 5, rectangular, or any other convenient shape to facilitate interconnection with receptors on a connector plane.

In the embodiment illustrated in FIG. 4, two fiber connections are illustrated, one to transmit optical signals from the optical module, and one over which the optical module may receive optical signals from the communications network. The optical and electrical characteristics of the optical module illustrated in FIGS. 4 and 5 will be discussed in more detail below. The invention is not limited to an optical module having two or four optical ports, as illustrated, or the illustrated number of electrical connectors, but rather extends to optical modules having any number of electrical connectors and any number of optical connectors. For example, the optical module could have a single optical connector, three optical connectors, or more than four optical connectors. Numerous optical modules configured to perform different functions and with different numbers of optical and electrical connectors are discussed below in connection with FIGS. 11–19.

Providing electrical and optical connections on the proximal end of the optical module enables the proximal end to plug into a receptor on a connector plane. The receptors may be distributed across the entire surface of a connector plane or along an edge of the connector plane adjacent the front of the network device. Additionally, since the fiber optic cables may be plugged into the receptor, fiber management may take place independent of the optical modules. This enables the fibers to be hidden from view, for example behind the face plate of the network device or on another side of the connector plane away from the optical modules, and enables the fiber optic cables to be permanently or semi-permanently attached to the connector plane. This simplifies fiber management and eliminates the fiber spaghetti conventionally associated with the use of conventional optical modules.

The optical modules may be formed of low temperature co-fired ceramic, which enables the optical modules to have the industry standard LC™ connector form factor. Use of low temperature co-fired ceramic also provides for placement of the tube and lenses in the LC™ connector using the same process used for laser/fiber alignment, and PIN diode/fiber alignment. Other materials such as ceramics, polymers, composites, or metals may be used to form the optical modules, however, and the invention is not limited to this one particular type of material. The optical module may be formed as one unitary component or may be formed in multiple parts that are configured to be attached together. For example, the connector structure may be formed integral with the module substrate for simplicity, or may be formed separate from the module substrate and later attached to the module substrate.

Figure 6:
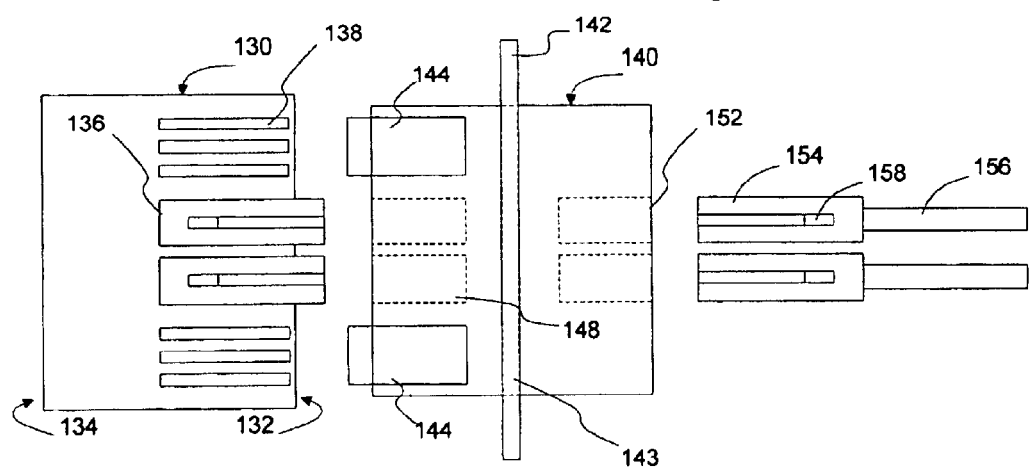
FIG. 6 is a top view of an optical module according to an embodiment of the invention.
Figure 7:
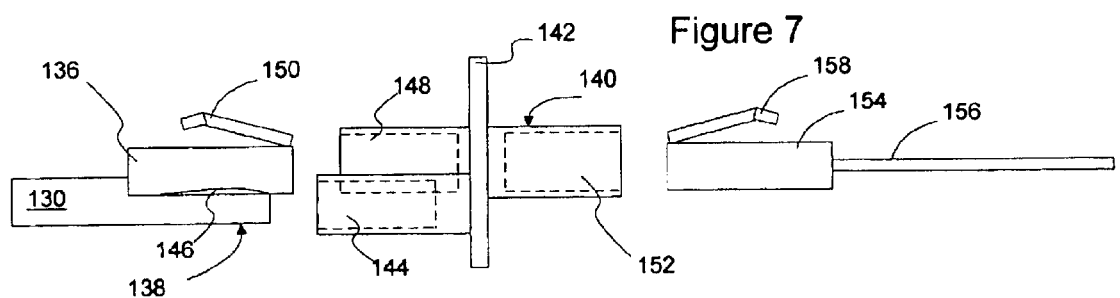
FIG. 7 is a side view of the optical module of FIG. 6.
Figure 10:
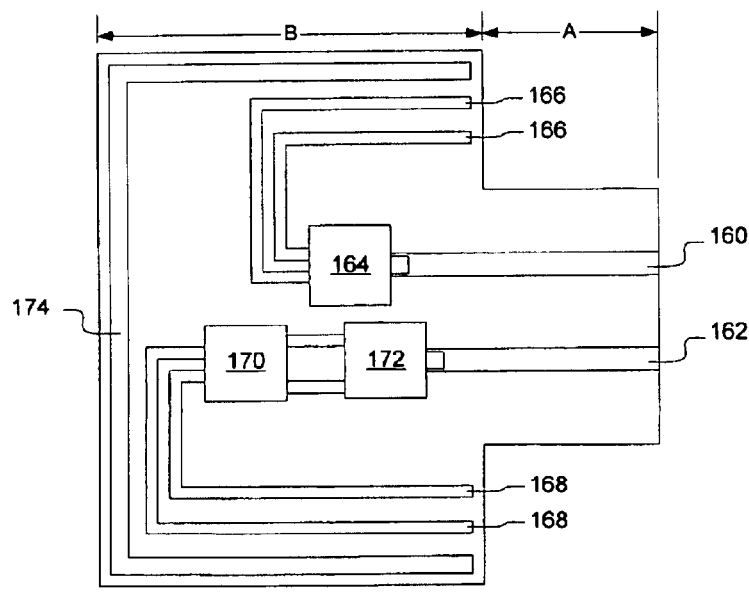
FIG. 10 is a functional block diagram of the electrical and optical components of the optical modules of embodiments illustrated in FIGS. 6–7 and 8–9.

Another embodiment of an optical module 130 is illustrated in FIGS. 6, 7 and 10, having a proximal end 132 and a distal end 134. In this embodiment, the optical and electrical connectors are all disposed in the proximal end, with the optical connectors disposed in a central region that is flanked on either side by a shelf holding the electrical connectors. As discussed in greater detail below, the optical module, in this embodiment, includes male optical connectors 136 configured to engage with female optical connectors on a connector plane, 148.

Figure 20:
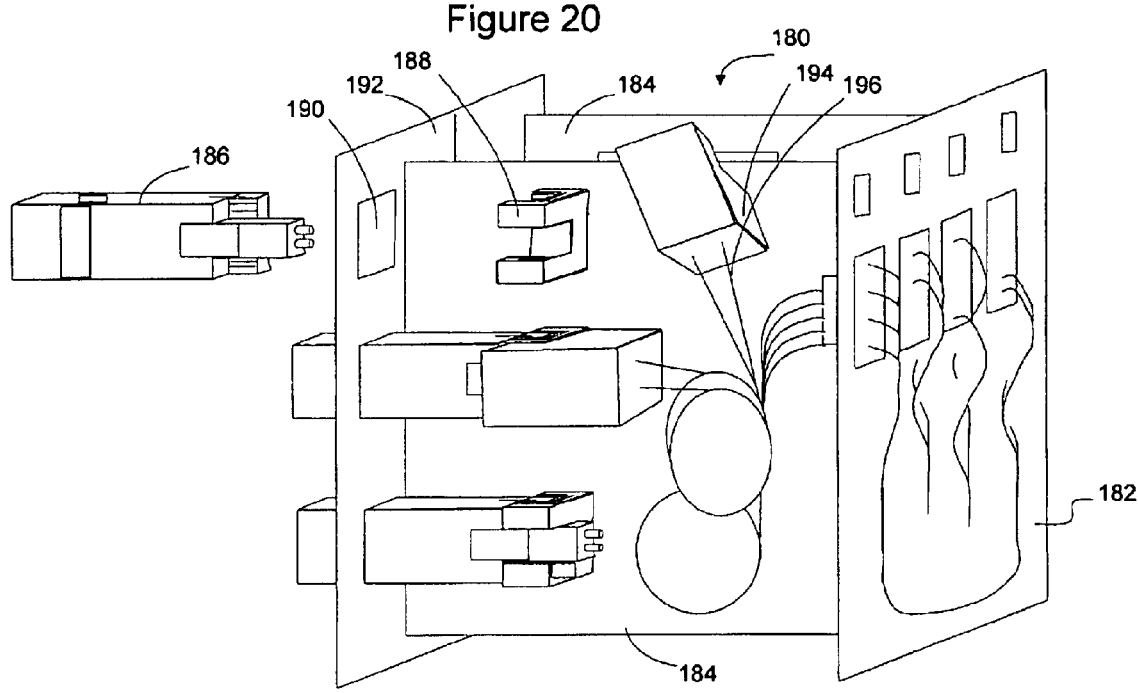
FIG. 20 is a network device according to an embodiment of the invention having optical modules extending through the face plate and interconnected with both optical and electrical connectors behind the face plate.
Figure 21:
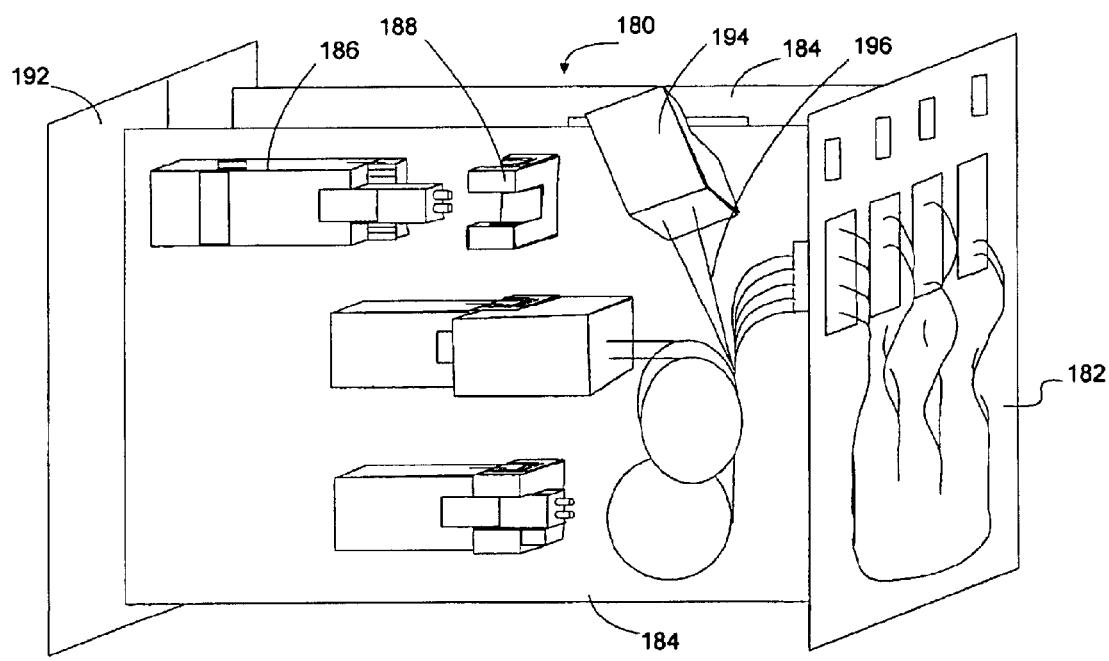
FIG. 21 is a network device according to an embodiment of the invention having optical modules interconnected with optical and electrical connectors behind the face plate.

The optical module 130 is configured to engage with a mating receptacle 140 disposed through connector plane 142. While the receptacle 140 in this embodiment is illustrated as being formed separately from the connector plane and seated in an aperture 143 in the connector plane 142, the receptacle may be formed integral with the connector plane, permanently or semipermanently attached to the connector plane, and may be electrically interconnected with traces on the connector plane. The invention is not limited to any particular interrelationship between the receptacle and the connector plane. Additionally, the optical module may be oriented normal to the surface of the connector plane, as illustrated, parallel to the surface of the connector plane (as illustrated in FIGS. 20 and 21), or oriented in any other angle there between.

The receptacle 140 includes a first set of electrical connectors 144 designed to engage with and form electrical interconnections with the electrical connectors 138 on the optical module. These electrical connectors 138, 144 may be low frequency electrical connectors, or optionally, may be formed as high frequency electrical connectors. In one embodiment, the electrical connectors in the receptacle 140 are exposed metallic strips and the electrical connectors 138 on the optical module 132 are exposed metallic strips 146 (see FIG. 7) that have been biased away from a surface of the optical module. Upon engagement between the optical module 130 and the receptacle 140, the biased metallic strip connectors 146 will engage with the exposed metallic strips in the receptacle, thereby consummating an electrical interconnection between the two connectors.

The receptacle 140 also includes two female optical connectors 148 configured to receive male optical connectors 136 depending from the optical module 130. The male optical connectors 136 may be standard connectors, such as LC™ connectors available from Lucent Technologies, or any other type of commercially available or proprietary optical connector. A latch 150, such as an RJ-style latch, may be provided on a surface of the optical connector 136 to enable secure placement and retention of the male optical connector 136 within the female optical connector 148 on receptacle 140.

The receptacle 140 is configured to extend through an aperture in the connector plane 142 to enable optical fibers to be connected to the receptacle on the opposite side of the connector plane from the optical module. Connecting the optical fibers to the receptacle enables the optical cables to be permanently or semipermanently attached to the connector plane, thereby eliminating the need to manipulate the optical cables when replacing or removing an optical module. Additionally, maintaining the optical connections on the other side of the connector plane from the optical module enables fiber management to take place in an area physically separated from the area containing the optical modules. This further facilitates maintenance and replacement of optical modules by eliminating unsightly fiber spaghetti and providing easy access to the optical modules.

In the embodiment illustrated in FIGS. 6 and 7, the receptacle 140 includes two female optical connectors 152 configured to mate with male optical connectors 154 disposed on the ends of optical cables 156. The optical cables 156 may be attached to each other via a yoke or other conventional structure, or may be separate optical cables, as illustrated. The male optical connectors 154 may be provided with a latch 158, such as an RJ-style latch, to enable secure placement and retention of the male optical connector 154 within the female optical connector 152 on receptacle 140. In one embodiment, the optical connectors 152, 154 are LC™ connectors, although the invention is not limited in this regard.

Figure 8:
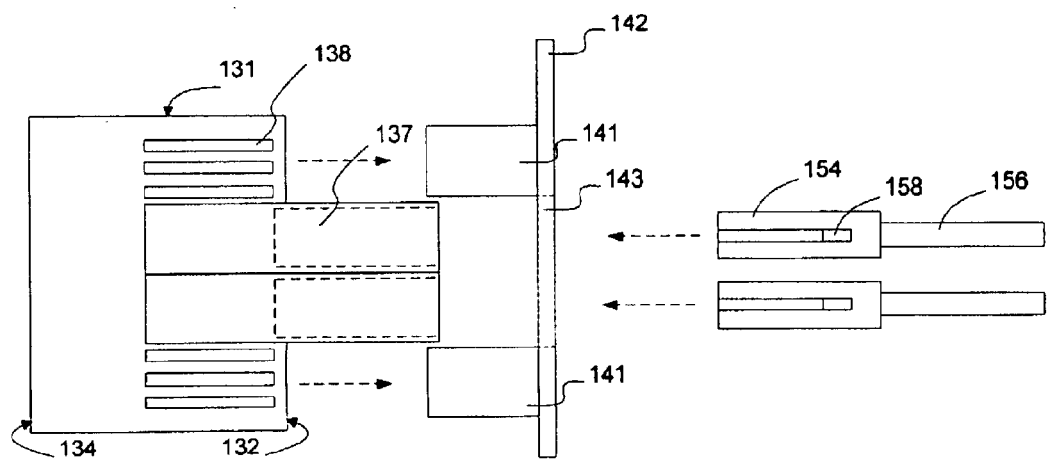
FIG. 8 is a top view of an optical module according to an embodiment of the invention.
Figure 9:
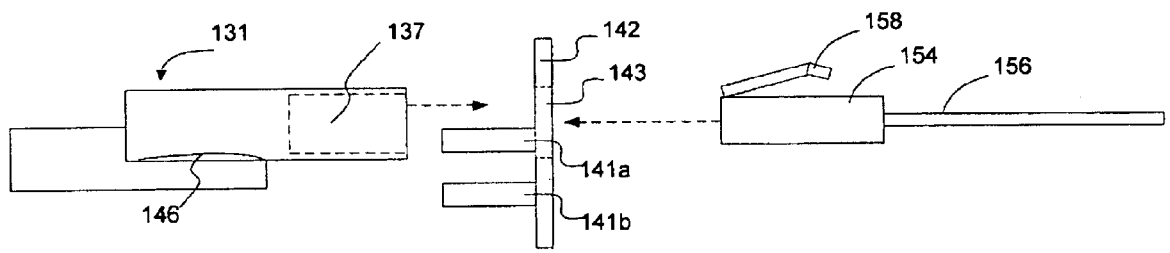
FIG. 9 is a side view of the optical module of FIG. 8.

Another embodiment of an optical module 131 is illustrated in FIGS. 8–10, having a proximal end 132 and a distal end 134. In this embodiment, as in the embodiment of FIGS. 6–8 and 10, the optical and electrical connectors are all disposed in the proximal end, with the optical connectors disposed in a central region that is flanked on either side by a shelf holding the electrical connectors. As discussed in greater detail below, the optical module, in this embodiment, includes female optical connectors 137 configured to engage with male optical connectors at a connector plane 142.

The optical module 131 is configured to engage with a mating receptacle 141 disposed on connector plane 142. The receptacle 141 in this embodiment is designed to have upper members 141a and lower members 141b (which may be unitary or separate structures) to support the optical module 131 and retain it upon engagement. The receptacle 141 may be formed integral with the connector plane, or formed separately from the connector plane and permanently or semipermanently attached to the connector plane, and may be electrically interconnected with traces on the connector plane. The receptacle 141 in this embodiment is situated around an aperture 143 in the connector plane 142 to enable an optical connection to be made through the connector plane. The optical module may be oriented normal to the surface of the connector plane, as illustrated, parallel to the surface of the connector plane (as illustrated in FIGS. 20 and 21), or oriented in any other angle there between.

The receptacle 141 includes a first set of electrical connectors 144 designed to engage with and form electrical interconnections with the electrical connectors 138 on the optical module. These electrical connectors 138, 144 may be low frequency electrical connectors, or optionally, may be formed as high frequency electrical connectors. In one embodiment, the electrical connectors 144 on the receptacle 141 are exposed metallic strips and the electrical connectors 138 on the optical module 132 are exposed metallic strips 146 (see FIG. 7) that have been biased away from a surface of the optical module. Upon engagement between the optical module 131 and the receptacle 141, the biased metallic strip connectors 146 will engage with the exposed metallic strips in the receptacle, thereby consummating an electrical interconnection between the two connectors.

The optical module 131 also includes two female optical connectors 137 configured to receive male optical connectors 154 disposed on the ends of optical cables 156. The optical cables 156 may be attached to each other via a yoke or other conventional structure, or may be separate optical cables, as illustrated. The male optical connectors 154 may be provided with a latch 158, such as an RJ-style latch, to enable secure placement and retention of the male optical connector 154 within the female optical connector 137 on optical module. 131. In one embodiment, the optical connectors 137, 154 are LC™ connectors, although the invention is not limited in this regard, as any other type of commercially available or proprietary optical connector may be used as well.

The female optical connectors 137 on optical module 131 may be positioned on the optical module to extend through an aperture 143 in the connector plane when engaged with the receptacle 141. Alternatively, the module may be formed such that the female optical connectors 137 are placed opposite the aperture 143 in the connector plane to enable the male optical connector to engage with the male optical connectors 154 on optical cables 156. In either embodiment, the optical connections are oriented on the end of the module to enable fiber management to take place on the other side of the connector plane from the optical module, thus enabling fiber management to take place in an area physically separated from the area containing the optical modules. Additionally, utilizing a single optical connection between the optical cable and optical module reduces signal attenuation and reflection that may be associated with using more than one optical connection.

FIG. 10 is a functional block diagram of electrical and optical components disposed 15 within the optical module 130 of FIGS. 6 and 7 and within the optical module 131 of FIGS. 8 and 9. As shown in FIG. 10, the optical module includes two cavities 160, 162 configured to hold optical fibers in alignment with the other optical components within the module. These cavities may be sized to hold the fiber itself, in the embodiment where male optical connectors are formed on the optical module 130, or may be sized to hold a male optical connector, where female optical connectors are formed on the optical module 131. In either instance, the optical fibers function to convey light impinging on the optical module to the appropriate optical components, and to convey light produced by the optical module out of the module. In the illustrated embodiment the optical channels are straight, although the invention is not limited in this regard.

Optical signals received over an optical fiber in cavity 160 are converted into electrical signals and conveyed via high frequency signal tracks 166 to the connector plane. In one embodiment, a photodetector, such as a PIN diode or avalanche photodiode, is used to convert optical signals into an output voltage. This output voltage is then amplified by a suitable amplifier, such as a transimpedance amplifier (TIA) 164, to raise the voltage of the output signal to an acceptable level for transmission to the connector plane. Optionally, the output signal may be conditioned to remove noise from the signal prior to transmission to the connector plane. The high frequency signal tracks 166 in the illustrated embodiment form a 10 Gigabit/second (Gb/s) differential pair, although the invention is not limited in this manner.

The optical module 130 also is configured to convert electrical signals to optical signals and to emit the optical signals over an optical fiber contained in cavity 162. Electrical signals to be converted and emitted by the optical module are received by the optical module via high frequency signal tracks 168. In the illustrated embodiment the high speed signal tracks 168 form a 10 Gb/s differential pair, although the invention is not limited in this manner.

Signals received by the optical module are input to a laser driver 170, which uses the signals in a conventional manner to drive laser 172. Laser 172 produces coherent light forming optical signals that are caused to impinge on an end of the optical fiber contained in cavity 162. A method and apparatus for implementing the connection between the high frequency signal tracks 166, 168 and the amplifier 164 or laser driver 170 is disclosed in U.S. patent application Ser. No. 09/821,722 filed Mar. 29, 2001, the content of which is hereby incorporated herein by reference.

In the embodiment illustrated in FIG. 8, a ground track 174 is formed around the perimeter of the optical module 130. This ground track provides a ground voltage potential to the electrical components in the optical module. The optical module is also provided with a supply voltage track (not illustrated), configured to be connected to the connector plane in a manner similar to the ground track, which provides power to the electrical components housed in the electrical module.

The dimensions A of the optical fiber connector area and the dimension B of the remainder of the optical module 130 enable the optical connections to be made in a separate region from that of the electrical connectors. Thus, if a plurality of optical modules are distributed across the face of a connector plane the optical connections will take place in a first plane (region) and the electrical connections will take place in a second plane (region). The spacing of these two connection regions may be adjusted, if necessary, to achieve desired fiber management objectives, signal transfer characteristics, or other objectives. In one embodiment, the sum of the dimensions of A and B may be 1 inch, where A is in the range of between 0 and 0.7 inches, and B is in the range of between 0.3 and 1 inches. The invention is not limited to this particular embodiment or a module employing these ranges. In another embodiment, B may be negative, such that the electrical connectors extend beyond the optical connectors. This may be advantageous, for example, where it is desired to have optical fiber management take place along the surface of the connector plane. Placing the optical connectors a distance away from the surface of the connector plane enables the optical cables connected to those modules to start to bend before reaching the surface of the connector plane. This enables the optical fiber management to take place along the surface of the connector plane adjacent the electrical connectors or, if apertures in the connector plane are provided, along the surface of the connector plane opposite the side containing the electrical connectors.

Other modules employing the inventive concepts disclosed herein may take on many different forms. The invention is thus not limited to the particular illustrated embodiments but extends to any other embodiment in which the module is configured to transmit electrical and optical signals from the same end of the module. Thus, the physical packaging of the optical module may be altered without departing from the spirit and scope of the invention. Additionally, as discussed above, the optical module may be formed to transmit signals at 10 Gb/s, or at another data rate, e.g. 2.5 Gb/s or 40 Gb/s. The invention is not limited to any particular data rate. Additionally, the transmit and receive data rates may be the same, as discussed above, or may be different, e.g. the transmit rate may be 40 Gb/s and the receive rate may be 10 Gb/s.

The preceding embodiments have focused on optical transceiver modules configured to convert electrical signals to optical signals, and to convert optical signals to electrical signals. Optical modules may be configured to perform other functions as well. Several such optical modules are illustrated in FIGS. 11–19. Each of the optical modules may be constructed according to the techniques described above in connection with FIGS. 4–10. Accordingly, a description of the physical aspects of each module will be omitted to avoid obscuring the invention.

FIG. 11 illustrates an embodiment of the invention in which the optical module performs functions associated with a pump laser. Pump lasers are conventionally used in network devices to provide laser power to optical amplifiers or other optical modules requiring access to a coherent or non-coherent light source. The pump laser module 210 according to this embodiment of the invention has electrical control and power input and output ports 212 and an optical pump laser output port 214 on one end of the module. Placing all the electrical and optical inputs/outputs on the same end of the optical module enables the optical pump laser module to be easily plugged into an appropriate receptacle in the network device in a manner similar to that discussed above with respect to the optical transceiver modules.

FIG. 12 illustrates an embodiment of the invention in which the optical module performs functions associated with an optical amplifier. Optical amplifiers are conventionally used in optical networks to amplify an optical signal without converting it to an electrical signal. The amplifier may be, for example, an erbium doped fiber amplifier, but the invention is not limited to this particular type of amplifier. As shown in FIG. 12, the optical amplifier module 220 has electrical control and power inputs/outputs on one end of the module. Three optical ports are also provided in the same end of the module, one to receive pump laser optical power 224 for use by the module in amplification of the data signal, one to receive the optical data signal 226, and one to output the amplified optical data signal 228. In operation, the optical module will receive an optical data signal over the optical data port 226, amplify the optical data signal using light received over the optical port 224, and output an amplified optical data signal over optical data port 228. Optionally, the optical amplifier may also perform additional functions, such as in connection with a digital signal, reshaping the signal, retiming the signal, or otherwise reconstructing the signal before retransmitting it over output data port 228.

FIG. 13 illustrates an embodiment of the invention in which the optical module performs functions associated with a laser source. A laser source module is an optical module that is conventionally used in optical network devices to provide laser light output, for example for use by an optical modulator (see FIG. 14) that does not include have its own laser. As illustrated in FIG. 13, the laser source module 230 has electrical control and power inputs/outputs 232 on one end, and an optical port configured to output coherent laser light 234 on the same end. In operation, the laser source module will receive control signals and power over the electrical port 232, generate coherent light, and output the coherent light on optical port 234.

FIG. 14 illustrates an embodiment of the invention in which the optical module performs functions associated with an optical modulator. An optical modulator is conventionally used to modulate an input coherent light source (such as from a laser source module of FIG. 13) with a data signal to output an optical data signal. The input data signal may be electrical or optical, although in the illustrated embodiment the input data signal is electrical. In FIG. 14, the optical modulator module 240 has electrical control and power inputs/outputs 242 on one end, and at least one electrical data signal input 244 on the same end. A laser optical input port 246 configured to receive light from a coherent light source (such as from the optical module of FIG. 13) and a data optical output port 248 configured to output modulated coherent light are also formed on the same end of the optical module. In operation, the optical modulator receives power and control signals over the electrical port 242, data signals over electrical port 244, and a coherent light signal to be modulated over optical port 246. The optical modulator uses the data signal to modulate the coherent light signal and outputs the modulated optical signal over optical port 248.

Figure 15:
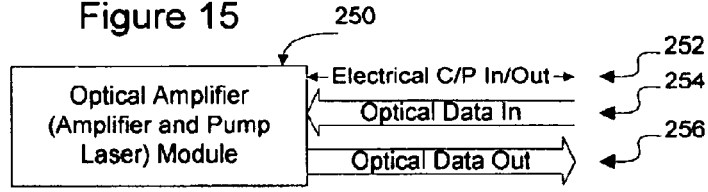

FIG. 15 illustrates an embodiment of the invention in which the optical module performs functions associated with an optical amplifier (integrated amplifier and pump laser). An optical amplifier module is conventionally used in network devices to perform the functions of both a pump laser module (see FIG. 11) and an amplifier module (see FIG. 12). Specifically, the optical amplifier module 250 of FIG. 15 has a pump laser integrated within the module so that pump laser light required by the amplifier to amplify the input optical signal is internally generated. This enables one module to be used to amplify the input data signals rather than two. In FIG. 15, optical amplifier module 250 has electrical control and power input/output ports on one end, and two optical ports on the same end. One of the optical ports is an input optical data port 254 configured to receive an optical signal via an optical cable, and the other optical port is an output optical data port 256 configured to output an optical signal to an optical cable. In operation, the optical amplifier module 250 receives an optical data signal over port 254, amplifies the input data signal, and outputs the amplified data signal over port 256. Optionally, the optical amplifier module may perform additional functions, such as reshaping the input signal, retiming the input signal, or otherwise reconstructing the input signal before retransmitting it over output data port 256.

Figure 16:
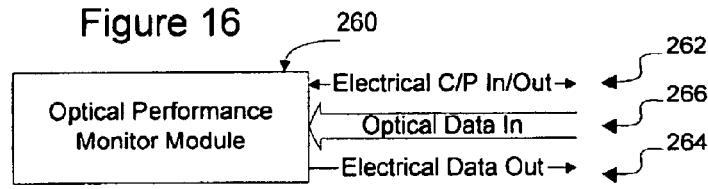

FIG. 16 illustrates an embodiment of the invention in which the optical module performs functions associated with an optical performance monitor. Optical performance monitors are conventionally used in optical networks to monitor the status of an optical link, whereby a portion of the signal sent over the link is split off from the optical fiber, e.g. via a beam splitter (see FIG. 19), and input to the optical module. If a problem is encountered on the optical link such that the signal is of reduced strength or is eliminated, the optical monitor can issue a distress signal or other feedback signal to boost the signal strength over the link or to initiate intervention by a network operator. In FIG. 16, the optical performance monitor module 260 according to this embodiment of the invention includes electrical control and power input/output ports 262, an electrical data output port 264 configured to output the result of the monitoring operations to the network device and/or network, and an optical data input port 266 configured to receive optical signals from the link to be monitored. The electrical ports 262, 264 and optical data port 266 are all formed on the same end of the optical module. In operation, the optical monitor module 260 receives an optical signal to be monitored on port 266 and outputs a report signal on port 264. The electrical output port 264 in this embodiment is conventionally a low speed data port since the quantity of information to be conveyed is relatively low. Optionally, multiple input optical ports 266 may be utilized to enable a single monitor module to be used to monitor multiple links.

Figure 17:
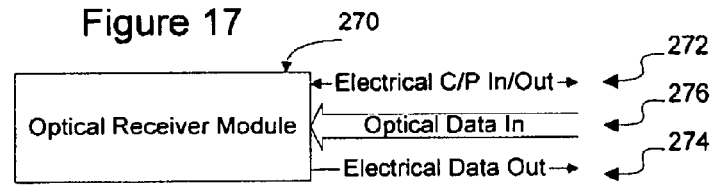

FIG. 17 illustrates an embodiment of the invention in which the optical module performs functions associated with an optical receiver. Optical receivers are conventionally used in network devices to convert optical data signals to electrical data signals. The optical receiver module 270 includes electrical control and power input/output ports 272 on one end, one or more high speed electrical data output ports 274 on the same end, and one or more optical data input port 276 on the same end. Data signals input on optical data input port 276 are converted by the optical receiver module into electrical data signals, which are then output on electrical data output port 274.

Figure 18:
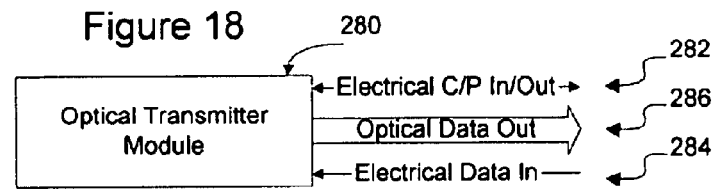

FIG. 18 illustrates an embodiment of the invention in which the optical module performs functions associated with an optical transmitter. Optical transmitters are conventionally used in network devices to convert electrical data signals to optical data signals. The optical transmitter module 280 includes electrical control and power input/output ports 282 on one end, one or more electrical data input ports 284 on the same end, and one or more optical data output ports 286 on the same end. In operation, electrical data signals input on port 284 are used to modulate a laser within optical transmitter module and the modulated laser light is output on port 286.

Figure 19:
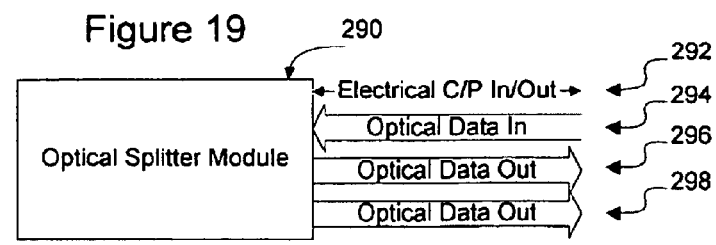

FIG. 19 illustrates an embodiment of the invention in which the optical module performs functions associated with a beam splitter. Beam splitters are conventionally used in network devices to split a single optical data signal from one optical path onto two data paths. It may be desirable in many situations to split a beam, for example where the data signal on the optical link is to be monitored or is otherwise required to be input to two or more different devices. The beam splitter may utilize a prism or other optical component to split the beam into two or more parts. Optionally, the beam splitter may convert the optical signal to an electrical signal and then reconvert it to two or more optical signals. If desired, the beam splitter may be configured to also amplify the split signals prior to transmission to avoid signal degradation associated with splitting the beam into two or more parts.

All of the optical modules discussed in connection with FIGS. 11–19 have the optical and electrical connections formed on one end of the optical module. As discussed in greater detail above, forming the electrical and optical connections on one end of the module enables the modules to be rapidly and conveniently serviced or replaced when it is determined that they may be damaged or malfunctioning. Additionally, optical fibers connected to the optical modules may be permanently or semipermanently secured within the network device for interconnection with the modules, enabling fiber management to take place independent of the modules and minimizing the possibility that an optical fiber may be connected to an incorrect optical module.

The modules discussed in connection with FIGS. 11–19 are examples of several types of modules. This sampling is far from exhaustive, and the invention extends to other sorts of modules that may be formed by combining the functionality of two or more of these illustrated modules, or by adding and/or substituting functionality to one or more of these modules. Accordingly, the invention is not limited to these particular illustrated embodiments.

Network Devices Incorporating Optical Modules

An embodiment of a network device configured to incorporate one or more of the optical modules discussed above in connection with FIGS. 4–19 is illustrated in FIGS. 20 and 21. As shown in FIGS. 20 and 21, a network device 180 includes a connector plane 182 and several functional cards 184 configured to receive one or more optical modules 186. The optical modules utilized in this embodiment are discussed in greater detail above in connection with FIGS. 4–19., and any of the embodiments may be used in the network device of FIGS. 20 and 21.

Electrical connectors 188 are attached to the functional card 184 to receive the optical modules 186 and provide electrical interconnectivity between the optical module and the network device 180. The functional card 184 may include electrical traces adapted to convey signals and power to/from the electrical connectors 188. Optionally, processing circuitry may be included on functional card 184. Alternatively, the functional card 184 may form a physical support for the electrical connectors 188 without providing electrical connectivity to the electrical connectors 188, in which case wires may be used to interconnect the electrical connectors 188 with the network device 180. In either instance, the electrical connectors may include high speed data channels, low speed control channels, power or ground tracks, or any other form of electrical interconnection required by the optical module.

In the embodiments illustrated in FIGS. 20 and 21, the electrical connectors are situated to receive the optical module parallel to the surface of the functional card. In FIG. 20, the electrical connectors are placed close to a front edge of the functional card so that optical modules may be plugged into the electrical connector through apertures 190 in faceplate 192. In FIG. 21, the electrical connectors are placed further back from the front edge of the functional card so that the optical modules may be maintained entirely behind the faceplate 192. Optionally, the electrical connectors may be formed in multiple areas to enable a portion of the optical modules to extend through the face plate 190.

An optical connector 194 is provided to connect the optical module with optical fiber cables. The optical connector 194 may be attached to the electrical connector 188 prior to insertion of the optical module, or may be attached to the optical module after the optical module has been inserted into the electrical connector. In one embodiment, the optical connector is configured to interlock with a mating portion of the electrical connector so that insertion or removal of the optical module does not cause the optical module to need to be repositioned. This is especially desirable, for example, where the optical modules are designed to be replaced through apertures 190 in faceplate 192 without removing the faceplate and potentially disturbing other functional optical modules.

In another embodiment, the optical connector 194 may take the form of a standard male optical connector, such as a LC™ connector available from Lucent Technologies, that has been previously attached to an end of one or more fiber optic cables 196. The invention is not limited to use of this particular LC™ connector, as any other type of commercially available or proprietary optical connector may suffice as well. The optical module 186, in this embodiment, contains a conforming female optical connector receptacle configured to receive the standard male optical connector (see FIGS. 8–9). A RJ-style latch, may be provided on a surface of the male optical connector 194 to enable secure placement and retention of the optical connector 194 within the female optical connector on optical module 186.

As illustrated in FIGS. 20 and 21, the network device 180 may include a plurality of functional cards to provide space for many optical modules. In the illustrated embodiment, two functional cards 184 are used, but the invention is not limited in this manner and extends to any number of functional cards. Additionally, in the illustrated embodiments each functional card has three optical modules. The invention is not limited in this manner either, as each functional card may include one, two, or many optical modules. Indeed, as the form factor for optical modules decreases, it is expected that each functional card may house an increased number of optical modules. Finally, in the illustrated embodiment, each functional card has optical modules on one surface. The invention is not limited in this manner and includes embodiments in which the functional cards are configured to receive optical modules on both surfaces.

Another network device configured to utilize optical modules is illustrated in FIGS. 22–26. In this embodiment, one or more connector plane(s) within the network device are mounted to be movable relative to the network device, such that the connector plane(s) may slide or rotate out of the network device to enable an operator to access the optical modules mounted on the connector plane(s). By making the connector plane(s) movable relative to the chassis of the network device, it is possible to provide greater access to the optical modules, and hence enable greater numbers of optical modules to be housed in a given network device.

Figure 22:
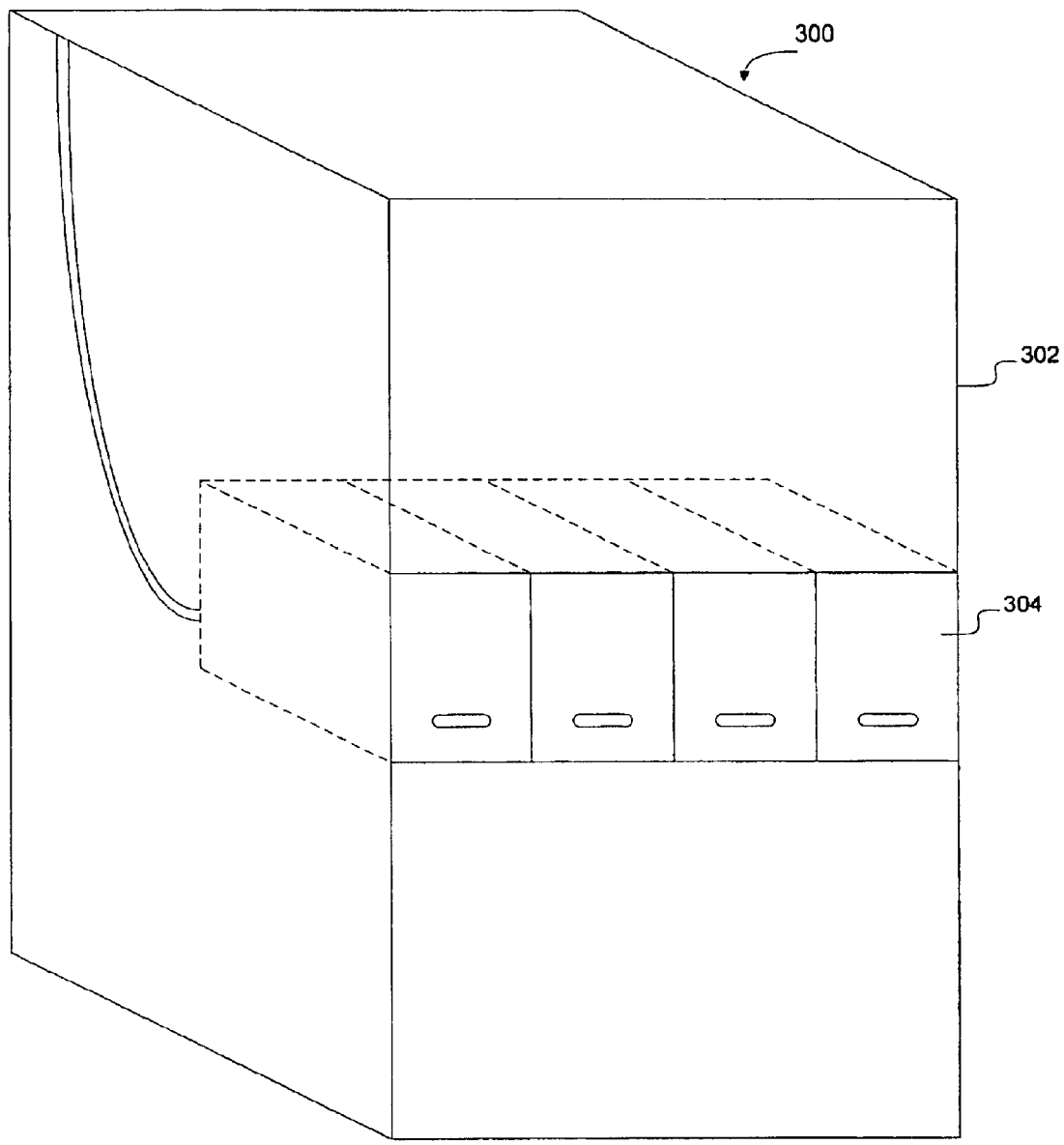
FIG. 22 is a network device according to an embodiment of the invention containing optical line card drawers.

One embodiment of a network device employing movable connector planes is illustrated in FIG. 22. In FIG. 22, a network device 300 has a chassis 302 and four drawers 304 that are designed to extend from the network device 300. The drawers may extend from the network device in any conventional manner, such as being mounted on slides or rails configured to support the drawer while in the extended position. A network device according to the invention may have any number of drawers, in a single row or in multiple rows, and the invention is not limited to any particular number of drawers. Alternatively, the drawers may have outer covers configured to open to allow access to movable connector planes designed to extend out of the network device. In this alternative embodiment, the connector planes are configured to extend out of the network device on slides or rails apart from any other supporting structure. The invention extends to any type of structure configured to enable the connector plane to be extended from the network device for convenient access by a maintenance technician or other interested personnel.

Figure 23:
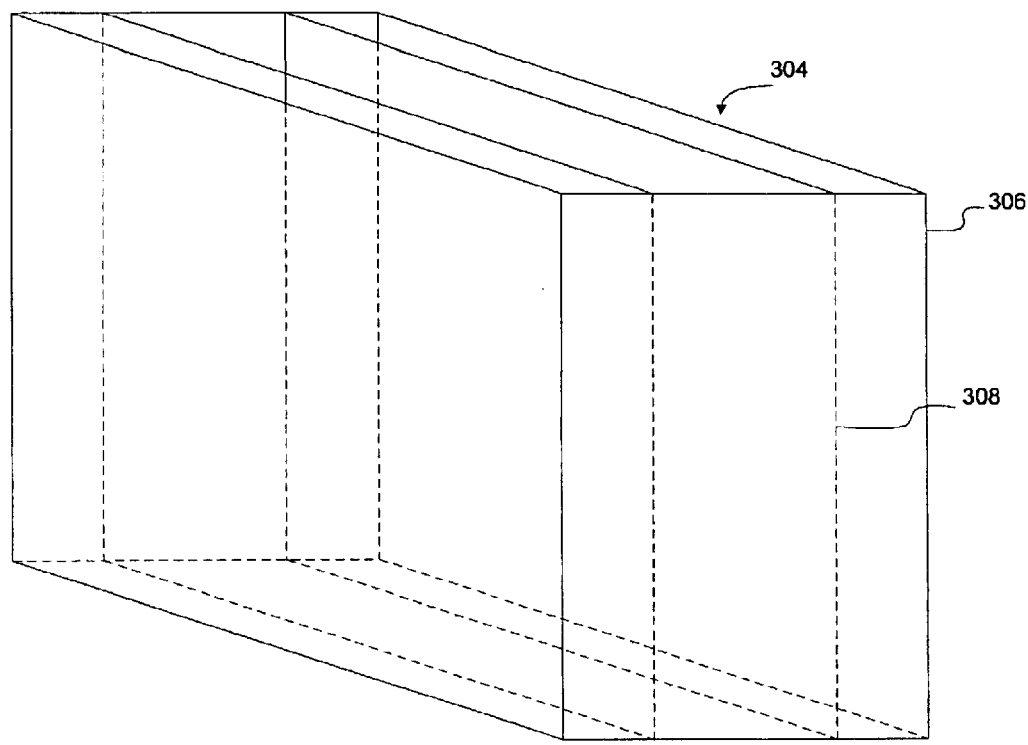
FIG. 23 is a perspective view of an optical line card drawer according to an embodiment of the invention.

One of the drawers from FIG. 22 is illustrated in perspective in FIG. 23. As shown in FIG. 23, the drawer is configured to hold at least one connector plane which is adapted to receive optical modules and/or other components (discussed above). In the embodiment illustrated in FIG. 22, the drawer 304 has a body 306 and two connector planes 308. Each connector plane 308 is configured to receive modules on the outside surface to enable the optical modules to be replaced with a minimal amount of effort. The invention is not limited to a drawer having two connector planes, however, as a single connector plane may be used as well (see FIG. 26), or multiple connector planes may be used.

The network device may have vertically oriented connector planes in vertical drawers, as illustrated, or may have horizontally oriented connector planes in horizontal drawers (not illustrated). Additionally, multiple vertically oriented connector planes may be disposed transversely (parallel to the drawer's face plate) in a larger pull-out drawer (not illustrated). In this embodiment, the connector planes may be accessed by sliding the connector planes up or across in channels or on slides along the edges of the connector planes. Accordingly, the invention is not limited to merely the illustrated embodiments, but extends to all manners of movably accessing the high density connector planes with optical modules as described herein.

To enable heat to be dissipated through ordinary convection and, in a rack mounted system, via the air circulation provided in the rack 100 (see FIG. 1), it is preferable to house the connector planes in a vertical orientation. If the connector planes are housed in a horizontal orientation, it may be necessary to include a chassis fan to circulate air through the chassis to maintain a constant temperature in the network device. Maintaining a relatively constant temperature is desirable, when using conventional optics, as conventional optical components, such as lasers and photodiodes, exhibit temperature dependent nonlinearities that may prove to be difficult to remove electronically.

Figure 24:
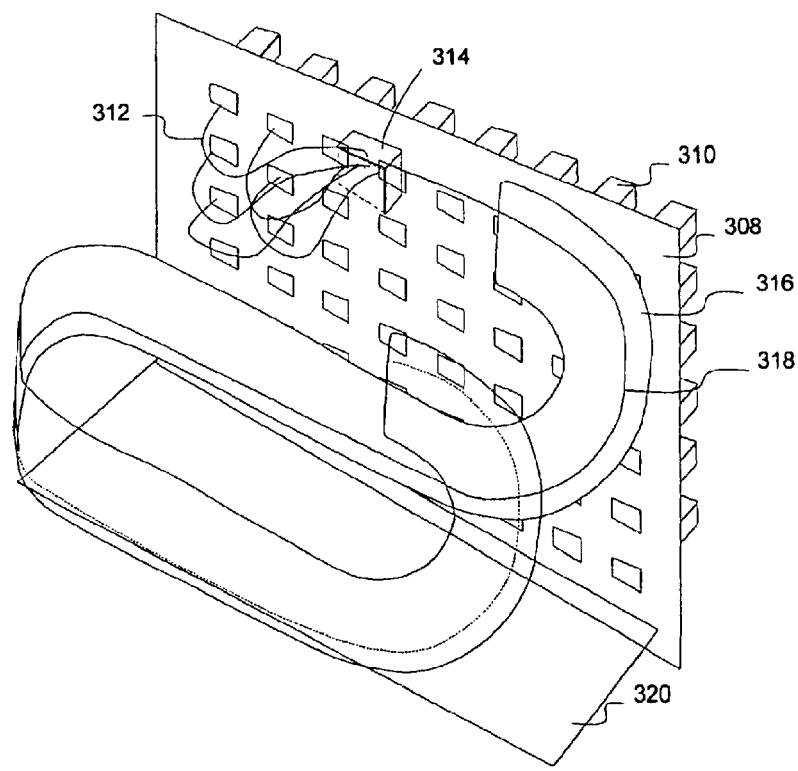
FIG. 24 is a perspective view of a connector plane for use in the optical line card drawer of FIG. 23.

FIG. 24 illustrates a connector plane for use in the network device of FIG. 22. As shown in FIG. 24, the connector plane 308 is configured to receive optical modules 310 (discussed above) on one surface and to interconnect with fiber optic cables 312 on the other. The optical fibers 312 are grouped together at a fiber breakout point 314 to form a ribbon fiber 316. The fibers 312 extending from fiber breakout point 314 may be formed by separating individual fibers from the ribbon fiber 316, or the fibers 312 may be terminated at fiber breakout point 314 and joined with fibers forming the ribbon fiber 316. Only one bundle of fibers has been illustrated in FIG. 24 to avoid obscuring the structure of the optical fibers and the interconnections between the fibers and the optical modules. In a real system, it would be expected that one or more optical fibers would extend to each of the functional optical modules. Accordingly, more than the illustrated number of optical fibers and/or optical fiber supports would be expected to be used in an operational network device.

To accommodate movement of the connector plane 308, the ribbon fiber is supported on a fiber support and is configured to be long enough to allow the connector plane to extend out of the network device. In the illustrated embodiment, the fiber support 318 is a Mylar support with punched ribbon fiber support clips. The invention may utilize other forms of fiber support, however, which enable the fiber to be maintained out of the way of the connector plane and prevent the fiber from kinking or bending too sharply. The amount of bending permissible will depend on the type of optical fiber being used in the network device.

Figure 26:
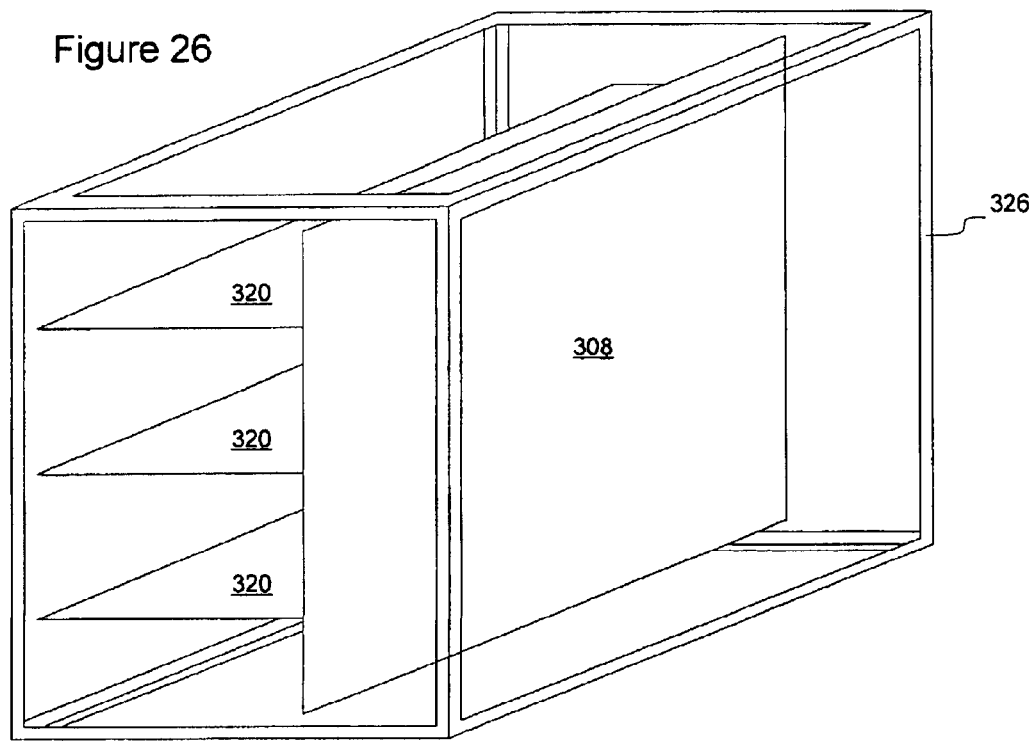
FIG. 26 is a perspective view of a connector plane positioned in an optical line card drawer.

Optionally, one or more electronic cards (functional cards) 320, as shown in FIG. 24 (single functional card) and FIG. 26 (multiple functional cards) may be included and attached to the connector plane. In an embodiment with multiple functional cards, the ribbon fibers can extend between the functional cards. The invention is not limited to any particular number of functional cards.

Figure 25:
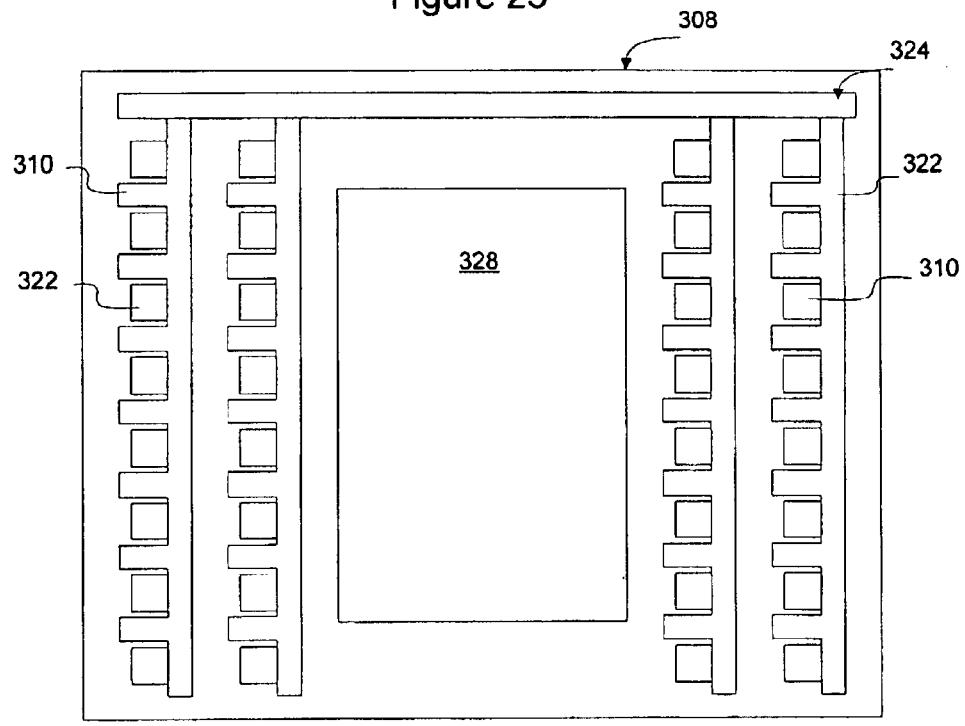
FIG. 25 is a side view of the connector plane of FIG. 24.

FIG. 25 illustrates one embodiment of a connector plane 308 that may be used in a drawer 304 of network device 300. As shown in FIG. 25, optical modules may be distributed across the surface of the connector plane 308. This placement enables a large number of optical modules to be housed on a single connector plane. Additionally, since the fiber management is on the other side of the connector plane, it is relatively easy to replace a defective or malfunctioning module. Likewise, since the connector plane 308 is designed to slide out of the network device 300, either together with or independent of drawer 304, it is easy to access the optical modules thus further facilitating replacement.

In the embodiment illustrated in FIG. 25, the optical modules 312 are surrounded, at least partially, by a heat sink 322. Optionally, the heat sink also may be formed to function as a optical module insertion guide system to facilitate proper placement of the optical modules into receptacles on the connector plane. In the embodiment illustrated in FIGS. 22–26, the connector planes are oriented vertically and the network device is designed to be cooled by circulating air. Fins may be formed on the surface of the heat sink to enhance heat dissipation, although the invention is not limited in this manner. Depending on the density of the optical modules, the spacing of the connector planes, and the types of optical and electrical components employed on the optical modules, it may be necessary to employ other types of heat dissipation devices, such as hydraulic or electrical cooling, in addition to or instead of air cooling. The invention is not limited to any particular method of cooling the network device.

A rail guide may be provided, as illustrated in FIG. 25, to support the connector plane for extension out of the network device. Optionally, the connector plane 308 may be supported within a rigid frame, such as the frame illustrated in FIG. 26, and may slide out of the network device together with the rigid frame 326.

The connector plane may have signal processing circuitry 328, such as 10G signal processing circuitry, configured on or formed integral with the substructure forming the connector plane 308. The connector plane may likewise employ multiple functional cards 320, as desired, to enable the connector plane to process signals according to the various protocols and conventions attendant to interaction in a communications network. The invention is not limited in this regard, however, as the signals may be passed off of the connector plane to another processing area instead.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. An optical module, comprising:
  a body having a proximal end and a distal end and containing at least one of an electrical component and an optical component configured to perform at least one of: optical signal amplification, electrical to optical signal conversion, and optical to electrical signal conversion;
  a first optical connector disposed on the body to face the proximal end of the body;
  a first shelf extending from the body; and
  a first electrical connector disposed on the first shelf to face the proximal end of the body.

2. The optical module of claim 1, further comprising a second optical connector disposed on the body to face the proximal end of the body.

3. The optical module of claim 1, further comprising a second shelf extending from the body, and a second electrical connector disposed on the second shelf to face the proximal end of the body.

4. The optical module of claim 1, further comprising:
  a second optical connector disposed on the body to face the proximal end of the body;
  a second shelf extending from the body; and
  a second electrical connector disposed on the second shelf to face the proximal end of the body.

5. The optical connector of claim 1, wherein the first optical connector is disposed at the proximal end of the body, and the first electrical connector is disposed a distance away from the proximal end of the body.

6. The optical connector of claim 1, wherein the first optical connector is configured to form an optical connection with a mating optical connector in a first region of the optical module, and the first electrical connector is configured to form an electrical connection with a mating electrical connector in a second region of the optical module, and wherein the first region and the second region are different distances from the proximal end of the optical module.

7. The optical module of claim 1, wherein the first electrical connector is a wire connector biased away from the body.

8. The optical module of claim 1, wherein the first optical connector is a male optical connectors.

9. The optical module of claim 1, wherein the first optical connector is a female optical connector.

10. An optical interconnect system for optically interconnecting an optical module and a connector plane, comprising:
  an optical module body containing at least one of an electrical component and an optical component configured to perform at least one of: optical signal amplification, electrical to optical signal conversion, and optical to electrical signal conversion, and having a proximal end and a distal end and a shelf extending from the body;
  a first optical connector disposed on the body to face the proximal end of the body;
  a first electrical connector disposed on the first shelf to face the proximal end of the body; and
  a receptacle body having a second electrical connector configured to mate with the first electrical connector.

11. The optical interconnect system of claim 10, further comprising:
  a second optical connector disposed on the body to face the proximal end of the body;
  a second shelf extending from the body; and
  a second electrical connector disposed on the second shelf to face the proximal end of the body.

12. The optical interconnect system of claim 10, wherein the first optical connector is disposed at the proximal end of the body, and the first electrical connector is disposed a distance away from the proximal end of the body.

13. The optical interconnect system of claim 10, wherein the first optical connector is configured to form an optical connection with a mating optical connector in a first region of the optical module body, and the first electrical connector is configured to form an electrical connection with a mating electrical connector in a second region of the optical module body, and wherein the first region and the second region are different distances from the proximal end of the optical module.

14. The optical interconnect system of claim 10, wherein the receptacle body is configured to be retained on the connector plane adjacent an aperture in the connector plane.

15. The optical interconnect system of claim 14, wherein the first optical connector is a female optical connector configured to be positioned adjacent the aperture in the connector plane to receive a mating connector on an optical cable disposed through the aperture.

16. The optical interconnect system of claim 14, wherein the first optical connector is a female optical connector configured to extend through the aperture in the connector plane to receive a mating connector on an optical cable.

17. The optical interconnect system of claim 14, wherein the receptacle body is configured to extend through the aperture in the connector plane.

18. The optical interconnect system of claim 17, wherein the receptacle body comprises a second optical connector configured to mate with the first optical connector, and wherein the receptacle body comprises a third optical connector configured to receive a mating connector on an optical cable.

19. The optical interconnect system of claim 10, wherein the optical module further comprises transformation components comprising at least a laser pin diode and a signal amplifier.

20. The optical interconnect system of claim 19, wherein the signal amplifier is a transimpedance amplifier.

* * * * *